United States Patent

[11] 3,617,309

| [72] | Inventor | Arnold Rebane |
| | | Villa Park, Ill. |
| [21] | Appl. No. | 822,718 |
| [22] | Filed | May 7, 1969 |
| [45] | Patented | Nov. 2, 1971 |
| [73] | Assignee | The Wander Company |
| | | Lincoln, Nebr. |

[54] PUFFED FOOD PRODUCT AND METHOD OF PRODUCING
8 Claims, No Drawings

[52] U.S. Cl. .................................................. 99/138 R, 99/166
[51] Int. Cl. ................................................... A23g 3/00, A23b 7/16
[50] Field of Search ...................................... 99/166, 138

[56] References Cited
UNITED STATES PATENTS

| 2,160,730 | 5/1939 | Hackett .................. | 99/138 |
| 2,240,759 | 5/1941 | Chandler ................ | 99/166 |
| 2,524,291 | 10/1950 | Hoffman ................ | 99/166 X |
| 2,607,691 | 8/1952 | Bettman ................. | 99/166 X |
| 2,824,009 | 2/1958 | Lindow .................. | 99/166 |
| 3,094,947 | 6/1963 | Green et al. ........... | 99/166 X |
| 3,323,922 | 6/1967 | Durst .................... | 99/166 |

Primary Examiner—Tim R. Miles
Attorney—Hibben, Noyes & Bicknell

ABSTRACT: A puffed food product, such as popcorn, having a thin protective outer glaze coating which encloses the puffed food product and protects the product against atmospheric moisture while preventing the loss of flavor from the product. One embodiment comprises an improved acid-fruit-flavored popcorn product which is prepared by applying a water-free oil base flavor solution to the popcorn, distributing a layer of powdered edible organic acid, such as citric, malic, tartaric, adipic, or succinic acid over the oil-base flavor coating, and applying a thin syrup glaze coating over the layer of organic acid to protect the popcorn against loss of crispness and flavor.

PUFFED FOOD PRODUCT AND METHOD OF PRODUCING

The invention relates generally to a puffed food product in particulate form and to a method of production, and, more particularly, to a popped corn product and a method of producing the popped corn product.

Among the puffed food products which are available to consumers are popped corn products which are sold as "popcorn." Popcorn is sold to consumers in a variety of forms including flavored popcorn which has the puffed corn kernels flavored with butter, cheese, or other flavoring agents. The flavor of these commercial popped corn products is often poor as a result of oxidation of the naturally occurring oil or because of the oxidation of the added flavoring material. The popcorn products sold through commercial channels also frequently lack their original crispness, because of the tendency of the popped corn when exposed to atmospheric moisture to absorb moisture until an equilibrium moisture content of about 8–10 percent is established within about 48 hours after popping. Also, when a flavoring agent, such as butter having a moisture content of about 15 percent, is added to the popcorn, there is an immediate loss of crispness. Attempts have been made heretofore to overcome one or more of the problems of providing a puffed food product having good flavor and crispness, but there has been no real success, particularly with a flavored popcorn product.

It is therefore an object of the present invention to provide an improved puffed food product, such as flavored popcorn product, which retains its original crispness and flavor over a prolonged period.

It is also an object of the present invention to provide an improved method of producing popped corn which retains its original crispness and flavor over a prolonged period.

It is a still further object of the present invention to provide an improved popped corn product flavored with a flavoring agent and a process of producing the flavored popcorn product.

Other objects of the present invention will be apparent to one skilled in the art from the following detailed description and claims.

The foregoing objects of the present invention are readily achieved by providing a puffed food product, such as popped corn, with a protective glaze coating which is substantially impervious to atmospheric moisture so as to protect the popped kernels or food material against external moisture and oxidation while also preventing the escape of delicate flavoring ingredients in the popped food material.

In a preferred embodiment of the present invention, the puffed food, such as popped corn, is provided immediately after popping with a flavored coating which is free of water, and thereafter providing the flavored popcorn with an outer protective glaze coating. The inner flavored coating can be comprised of water-free butter, water-free butter blended with a vegetable oil, or a food-flavoring concentrate dissolved in an edible oil, such as fruit flavoring in vegetable oil. The flavored coating can be applied to the freshly popped popcorn by spraying or pouring the fluid-flavoring material onto the popcorn held in a revolving coating pan until the popcorn is uniformly coated with the flavoring material. If desired, the coating can be applied in a continuous process while the popped corn is being carried by a continuous screw conveyor means.

The outer protective glaze coating which is applied to the popcorn, preferably over an inner flavored coating, is comprised of a sugar base syrup which is prepared by heating a mixture of granulated sugar and corn syrup or equivalent ingredient to a temperature of 290° F. to 300° F. to form a fluid syrup which when applied as a thin film and cooled forms a hard nonsticky glaze coating substantially impervious to atmospheric moisture and oxygen over the entire surface of the popcorn. The syrup can contain an added flavoring agent. Also, if desired, an approved food-coloring agent can be included in the syrup. The flavoring agent is preferably added to the syrup at the end of the cooking period in a batch operation or can be diluted with a vegetable oil, propylene glycol or other food grade carrier and the flavor solution combined with the syrup just prior to the application of the syrup to the popped corn.

The syrup, with or without flavoring material, can be applied to the popped corn either in a revolving coating pan, a screw conveyor, a natural frequency conveyor, a fluidized bed conveyor or equivalent means which will continually rotate the kernels to achieve a uniform distribution of the syrup over the entire surface of the popped corn. The syrup can be metered onto the popcorn as a solid stream in a continuous process or, if desired, a premeasured quantity of the syrup can be added to the popped corn in a batch operation.

If the flavoring agent for the popcorn comprises an acidic flavoring material, such as lemon, orange, apple or the like acidic flavoring agent, inversion of the sucrose in the outer glaze coating takes place when an acidic flavoring agent contacts the syrup resulting in a dark, bitter, sticky coating. In order to avoid forming an outer coating on the popcorn which is dark in color, bitter in flavor and sticky in consistency when an acid fruit flavor is required, the desired flavor concentrate, either natural or artificial, is dissolved in a suitable nonaqueous solvent and applied directly to the surface of popcorn or other puffed food material. Before applying the glazed coating, a finely divided food grade edible organic acid, such as citric, malic, tartaric, adipic or succinic acid, is applied over the surface of the flavor coating on the popcorn. The powdered organic acid adheres to the flavor coating on the surface of the popcorn. The protective glazed coating can then be applied over the coating of the powdered organic acid without having the syrup degraded and forming a dark, bitter, or sticky coating.

After the popped corn or the like product has been coated with the protective glaze-forming syrup, the product is passed through heated spreader rolls or manually spread into a single-kernel popcorn layer or clusters, as desired. The layer of popcorn is then passed through a conventional cooling tunnel or cooled on a cooling table to reduce the temperature to room temperature and packaged.

In order to further illustrate the present invention the following specific examples are provided without, however, limiting the invention to the specific material, ingredients, or proportions used in the examples.

EXAMPLE 1

A 15-pound quantity of freshly popped popcorn was sprayed in a revolving coating pan with a uniform blend of 3.25 pounds of water-free salted butter uniformly blended with 8.25 pounds coconut oil and colored with 0.002 pound beta carotene. A coating glaze was made by cooking to a temperature of 290° F. a solution of 52 pounds of granulated sugar, 16.6 pounds corn syrup and 2.5 pounds salt. The resulting syrup was poured over the tumbling popped corn in the revolving pan and mixing was continued in the revolving pan until the popped corn was uniformly coated. The coated and flavored popped corn was then passed through a pair of heated spreader rollers and deposited on a belt which conveyed it through a cooling tunnel where it was cooled to room temperature.

EXAMPLE 2

An 18.4-pound quantity of freshly popped popcorn was sprayed in a revolving coating pan with 0.6 pound oil solubilized imitation apple flavor, and thereafter 1.2 pound of 40-mesh citric acid was dusted onto the tumbling flavored popped corn. A coating glaze was prepared by heating to a temperature of 290° F. a solution of 45.4 pounds sugar, 25.7 pounds corn syrup, 8.6 pounds coconut oil and 0.0004 pound approved green food coloring. The syrup was poured over the tumbling flavored popped corn, and the batch was allowed to mix for 2 to 3 minutes until thin glaze coating was uniformly formed over the popped corn kernels. The batch was then passed through heated spreader rollers onto a belt which conveyed it through a cooling tunnel which cooled the product to room temperature.

While the foregoing specific examples show the preparation of coated popped corn, it should be understood that other food products can be prepared in accordance with the present invention without departing from the broad scope of the invention. For example, puffed rice, puffed wheat, and other puffed or cooked cereal foods used for breakfast or snacks, including cooked extruded food mixtures, such as cereal doughs, in particulate form can be used in practicing the present invention in place of popped corn and are included within the scope of the present invention.

I claim:

1. A process of producing a flavored puffed food product which comprises; applying to the surface of a puffed food product in particulate form a liquid coating free of water and containing a flavoring agent, dusting over the said coating a layer of finely divided edible organic acid, and applying on the surface of the layer of the organic acid a uniform thin glaze coating comprising a sucrose base syrup which on solidifying forms a nontacky film substantially impervious to atmospheric moisture and oxygen.

2. A process as in claim 1, wherein said organic acid is selected from the group consisting of citric, malic, tartaric, adipic, and succinic acids.

3. A process as in claim 2, wherein said flavoring agent is an acidic food-flavoring material.

4. A process as in claim 3, wherein said acidic food-flavoring material is selected from the group consisting of lemon, orange and apple flavoring agents.

5. A puffed food product which comprises; a puffed food product in particulate form having on the surface thereof a flavor coating free of water and containing a flavoring agent, a layer of finely divided edible organic acid over the said flavor coating, and a uniform thin glaze coating over the said layer of finely divided edible organic acid which encloses each particulate form and which comprises a sucrose base syrup which on solidifying forms a nontacky film substantially impervious to atmospheric moisture and oxygen.

6. A puffed food product as in claim 5, wherein said organic acid is selected from the group consisting of citric, malic, tartaric, adipic, and succinic acids.

7. A puffed food product as in claim 6, wherein said flavoring agent is an acidic food-flavoring material.

8. A puffed food product as in claim 7, wherein said acidic food-flavoring material is selected from the group consisting of lemon, orange and apple flavoring agents.

* * * * *